April 19, 1966 A. J. ERIKSON 3,247,496

ASSEMBLIES OF MAGNETIC ELEMENTS

Filed Oct. 12, 1961

INVENTOR.
ADOLF J. ERIKSON
BY
Carl V. Olson
ATTORNEY

United States Patent Office 3,247,496
Patented Apr. 19, 1966

3,247,496

ASSEMBLIES OF MAGNETIC ELEMENTS

Adolf J. Erikson, Norwood, Mass., assignor to Radio Corporation of America, a corporation of Delaware Filed Oct. 12, 1961, Ser. No. 144,597
8 Claims. (Cl. 340—174)

This invention relates to assemblies of magnetic elements, such as storage or memory elements, and particularly to assemblies of apertured magnetic elements of very small dimensions. The invention is useful as applied to random access high-speed memories of electronic data processing apparatus, and particularly to memories of the type wherein each memory element is adapted to be rapidly switched from one magnetic state to another as the result of electric currents flowing in one printed conductor and one conductor wire passing through the aperture.

Random access high-speed memories presently in use are customarily constructed of a large array of ferrite magnetic annular cores which are threaded by row and column wire conductors. Each core is threaded by at least one row wire and at least one column wire. Such memories are capable of being operated with a read-write cycle time of as low as 1.5 microseconds.

In order to make random access memories capable of even faster operating speeds, it is desirable to reduce the size of the apertures to a diameter such as 10 milli-inches, or 5 milli-inches, or even smaller. When the apertures in the cores are made this small, it is very difficult to support the cores and to thread a plurality of wires through the apertures in the cores. It is also very difficult, following conventional techniques, to construct an array of a large number of equally good cores, and to replace defective cores in an array.

It is therefore a general object of this invention to provide an improved assembly of magnetic elements having very small physical dimensions.

It is another object to provide an assembly of magnetic storage elements capable of a read-write cycle time of one-half microsecond.

It is a further object to provide an assembly of magnetic storage elements characterized in being relatively easy to construct and repair.

It is yet another object to provide an improved assembly of memory elements wherein each memory element is provided with one printed conductor and one threaded wire conductor.

According to an example of the invention, there is provided an elongated rigid channel having a U-shaped cross section, and an elongated resilient channel of insulating material also having a U-shaped cross section and being positioned snugly in the trough of the rigid channel. Magnetic element means, preferably constructed of a ferrite magnetic material, is positioned with an edge in the trough of the resilient channel with an apertured portion extending above the top of the channel. The magnetic element means may consist of a large number of apertured magnetic tiles each having one or more apertures therein, or may consist of a single multi-apertured magnetic strip. A printed conductor extends along the magnetic means and passes in succession through the apertures therein. A plane of magnetic elements consists of a number of the above-described strip assemblies placed side by side with transversely extending insulated conductor wires each extending through corresponding apertures of the plurality of side-by-side strip assemblies.

These and other objects and aspects of the invention will be more apparent to those skilled in the art from the following more detailed description taken in conjunction with the appended drawings, wherein.

Figures 1, 2, 3, 4, 5:
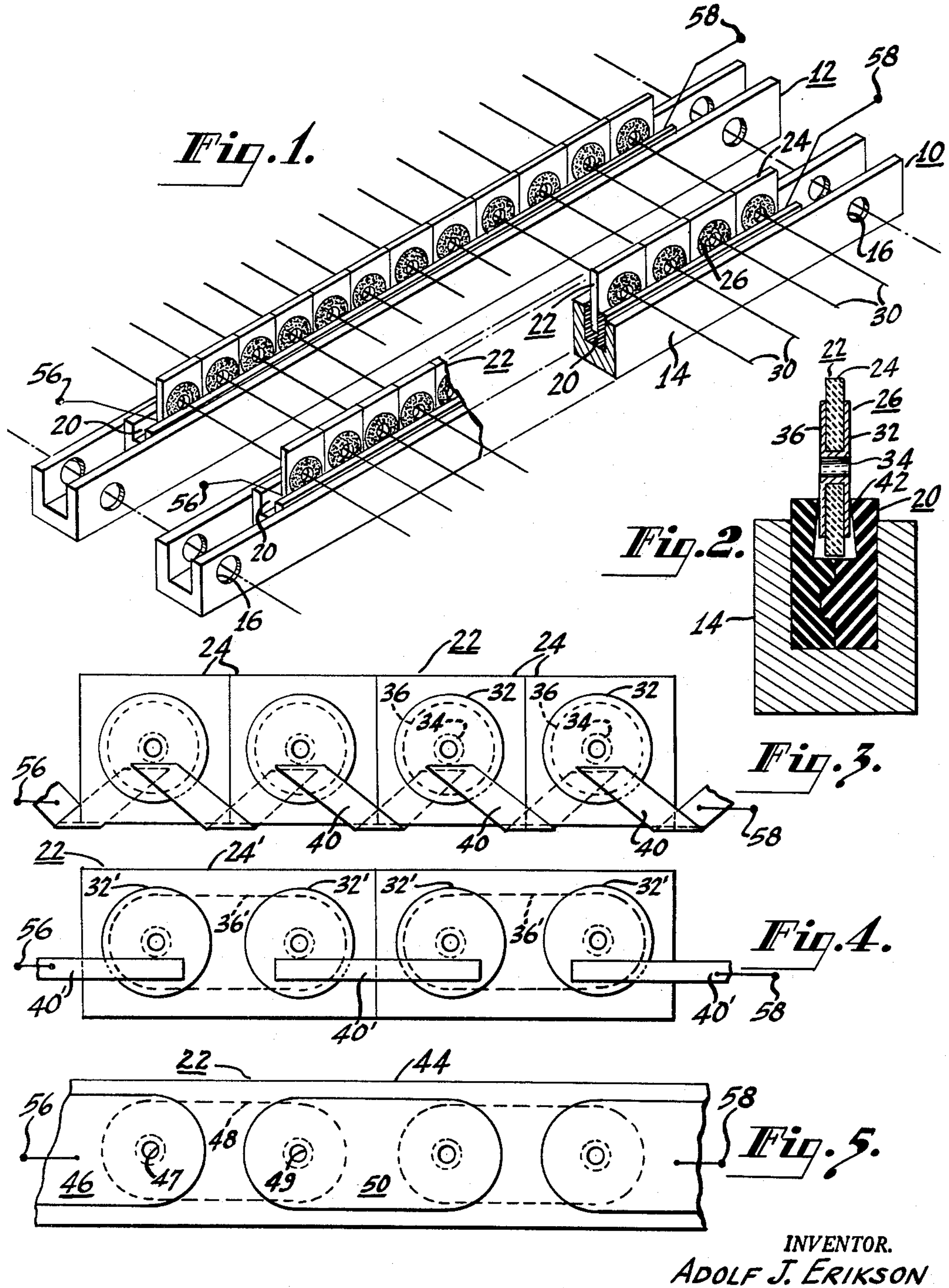
FIGURE 1 is an expanded isometric view, having a portion cut away, showing an assembly of magnetic storage elements constructed according to the teachings of this invention.
FIGURE 2 is a cross-sectional view illustrating the manner in which the magnetic storage elements are mounted in and supported by rigid and resilient U-shaped channels.
FIGURE 3 illustrates a magnetic memory means consisting of a row of apertured ferrite magnetic tiles which are provided with conductors providing a path going through all the apertures in succession.
FIGURE 4 illustrates an alternative construction wherein each magnetic tile is provided with two apertures.
FIGURE 5 illustrates another alternative construction wherein the magnetic storage means is a continuous strip of magnetic material provided with printed windings linking all the apertures in succession.

FIGURE 1 shows two strip assemblies 10 and 12 arranged to form part of a memory plane. Each strip assembly includes an elongated rigid channel 14 having a U-shaped cross section. The rigid channel 14 is provided with alignment holes 16 so that a plurality of strip assemblies can be accurately aligned in side-by-side relationship in a plane. The rigid channel 14 may be constructed of any suitable non-magnetic material such as aluminum.

An elongated resilient channel 20 of insulating material, also having a U-shaped cross section, is positioned in the trough of the rigid U-shaped channel 14. The resilient channel 20 may be of a plastic material. Solely by way of example, a plastic sold by the Monsanto Chemical Company under the trade name "Lustran" has been found suitable.

Magnetic means, which may be storage element means 22, is positioned with an edge snugly fit in the trough of the resilient channel 20. The magnetic storage element means 22 in FIGURE 1 is shown to consist of a plurality of ferrite magnetic tiles 24 each having a central aperture located in the portion of the tile which extends above the top of the channels 14 and 20. Each tile 24 is provided with a spool-shaped printed conductor 26 having portions on both sides of the tile and having an integral connecting portion on the walls of the aperture. Stated another way, the printed conductor 26 covers the walls of the aperture and extends along both sides of the tile.

Insulated wire conductors 30 are provided extending in a direction transverse to the strip assemblies 10 and 12. Each insulated wire conductor 30 is threaded through corresponding apertures in the side-by-side strip assemblies 10 and 12.

The magnetic material surrounding each aperture constitutes a magnetic storage or a memory element. Each memory element is linked by a printed conductor 26 on the walls of the apertures, and by a threaded wire conductor 30 extending through the aperture. By this construction, the aperture can be made very small (a few milli-inches) and yet can be threaded manually by a wire having a diameter of one or a few milli-inches. The manner in which the printed conductors on each magnetic tile 24 are connected together is not shown in FIGURE 1, but will be described in connection with FIGURES 3 through 5.

FIGURE 2 shows a cross-sectional view illustrating the manner in which the fragile magnetic memory tiles 24 are securely and gently gripped by the resilient channel 20, which is in turn positioned in the rigid channel 14. The printed conductor 26 of the magnetic memory tile 24 includes a portion 32 on one side of the tile, a portion 34 on the wall of the aperture and a portion 36 on the other side of the tile.

The resilient channel 20 is preferably constructed of two interlocked strips, and is preferably constructed to have a reentrantly-tapered trough defined by tapered walls, as shown in FIGURE 2. The illustrated construction facilitates the placing of magnetic memory tiles 24 in the trough of the resilient channel 20 prior to its insertion in the trough of the rigid channel 14. The two interlocking strips of the resilient channel 20 may be separated sufficiently to widen the trough and simplify the placing of memory tiles in the trough. When the two interlocking strips of the resilient channel 20 are then urged together and pressed into the trough of the rigid channel 14, the resilient channel 20 is caused to securely and resiliently grip the memory tiles 24. The tapered walls defining the trough in the resilient channel 20 also contribute to the ease with which the parts can be assembled, and contribute to the secure resilient mounting of the memory tiles with relation to the rigid channel 14.

By way of example only, a memory assembly as illustrated has been constructed wherein the rigid channel 10 had a width of 0.094 inch, a height of 0.156 inch and a length of 2 inches; the resilient channel 20 had a width of 0.046 inch and a height of 0.1 inch; and the magnetic memory tiles 24 had an outside dimension of 0.05 inch and a thickness of 0.01 inch.

FIGURE 3 shows an arrangement of conductors on the magnetic tiles 24 which provides a conductive path extending along the row of tiles and links the apertures therein in succession. Conductors 40 connect the printed conductor 32 on one side of a tile to the printed conductor 36 on the opposite side of the next adjacent tile. The conductors 40 are preferably printed in the trough of the resilient insulating channel 20. Alternatively, the conductors 40 may be metal strips diagonally positioned in the trough of the resilient insulating channel 20. In either case, the electrical connections between the ends of the conductors 40 and the conductors 32 and 36 on the sides of the tiles 24 may be perfected by a suitable method, such as dip soldering or electroplating.

FIGURE 4 shows an alternative construction of the magnetic storage element means 22 wherein each ferrite magnetic tile 24′ is provided with two apertures. The printed conductor on the walls of the apertures is integral with printed conductors 32′ on one side of the tile, and is integral with a printed conductor 36′ on the opposite side of the tile. Additional conductors 40′ are provided to connect the printed conductor 32′ (or 32 in FIGS. 1, 2 and 3) of one tile to the printed conductor 32′ (or 32) of the next adjacent tile. The conductors 40 or 40′ may be printed on the top edge 42 (FIGURE 2) of the resilient channel 20, and the electrical connections between the conductors 40 or 40′ and 32 or 32′ may be perfected by dip soldering or electroplating.

FIGURE 5 shows a magnetic storage element means consisting of a single strip 44 of magnetic material such as ferrite. The magnetic strip 44 may be used in place of the plurality of tiles illustrated in one of the strip assemblies 10 and 12 in FIGURE 1. The magnetic strip 44 is provided with printed conductors which provide a path going from the conductor 46 on one side of the strip, down through the aperture 47 to the conductor 48 on the other side of the strip, up through the aperture 49 to the conductor 50 on the top side of the strip, and so on along the length of the strip.

The magnetic strip 44 may be constructed by the doctor blading of a slurry of a ferrite powder and a volatile binder onto a flat surface of a substrate such as glass. After being dried, the resulting flexible sheet is stripped from the substrate, cut into strips of suitable width and compressed in a press maintained at an elevated temperature sufficiently high to cure the ferrite and give it the magnetic properties required for magnetic storage purposes. Thereafter, the cured or fired strip is provided with the printed conductors 46, 48 and 50.

In all the alternative constructions shown in FIGURES 3, 4 and 5, a printed conductor is provided which extends along the magnetic storage means and passes in succession through the apertures therein. The conductive paths are illustrated in FIGURES 1 and 3–5 as extending from terminals 56 to 58.

It is seen that according to this invention there may be provided an assembly of apertured magnetic elements wherein a printed conductor is provided which passes through all of the apertures in one strip assembly in succession, and wherein a second threaded insulated wire conductor is provided extending transversely through the apertures, the assembly being adapted to provide operation at very high speeds by virtue of being adapted to construction in very small dimensions.

What is claimed is:

1. An assembly of elements comprising an elongated rigid channel having a U-shaped cross section, an elongated resilient channel of insulating material also having a U-shaped cross section and being positioned snugly in the trough of said rigid channel, magnetic means having an edge positioned in the trough of said resilient channel and having a portion extending thereabove, said magnetic means having a plurality of apertures therein located in the portion of the memory means extending above the top of said insulating channel, a printed conductor extending on the sides of the magnetic means and passing in succession through the apertures therein, and insulated wires threaded through said apertures and extending in a direction transverse to said elongated channels.

2. An assembly of memory elements comprising an elongated rigid channel having a U-shaped cross section, an elongated resilient channel of insulating material also having a U-shaped cross section and being positioned snugly in the trough of said rigid channel, a plurality of magnetic memory tiles each having an edge positioned in the trough of said resilient channel and having a portion extending thereabove, said magnetic memory tiles each having at least one aperture therein located in the portion of the magnetic memory tile extending above the top of said insulating channel, printed conductor means on the sides of said tiles and the walls of the apertures therein, additional printed conductor means connecting the printed conductors on successive tiles, and insulated wires threaded through said apertures and extending in a direction transverse to said elongated channels.

3. A memory plane assembly comprising a plurality of strip assemblies, each of said strip assemblies including an elongated rigid channel having a U-shaped cross section, an elongated resilient channel of insulating material also having a U-shaped cross section and being positioned snugly in the trough of said rigid channel, magnetic memory means having an edge positioned in the trough of said resilient channel and having a portion extending thereabove, said magnetic memory means having a plurality of apertures therein located in the portion of the memory means extending above the top of said insulating channel, said memory means having printed conductor means on the sides thereof and on the walls of the apertures therein, said strip assemblies being arranged side by side in a plane, and insulated wires threaded through said apertures and extending in a direction transverse to said strips, each of said wires extending through corresponding apertures of the plurality of side-by-side strip assemblies.

4. In an assembly of magnetic memory elements, the combination of an insulating member having a top surface with a trough therein, a plurality of magnetic memory elements each having sides and a transverse aperture and having a spool-shaped printed conductor extending from one side and along the wall of said aperture to the other side, said magnetic elements being positioned in the trough of said insulating member so that portions of the printed conductors on the sides of the magnetic elements extend down into said trough and the apertures of the magnetic elements extend transverse to said trough, and printed conductors on the top of said insulating member connecting said printed conductors on said magnetic elements at the sides thereof.

5. An assembly of magnetic elements comprising an insulating member having a top surface with a trough therein, magnetic element means having sides and transverse apertures and having connecting printed conductors on said sides and on the walls of said apertures, said magnetic element means having an edge positioned in the trough of said insulating member so that portions of the printed conductors on the sides of the magnetic element means extend down into said trough and the apertures extend transversely of said trough above the top surface of the insulating member, and printed conductors on the top surface of said insulating member connecting said printed conductors on said magnetic element means.

6. An assembly of magnetic elements comprising an insulating member having a top surface with a trough therein, magnetic element means having sides and transverse apertures and having connecting printed conductors on said sides and on the walls of said apertures, said magnetic element means having an edge positioned in the trough of said insulating member so that portions of the printed conductors on the sides of the magnetic element means extend down into said trough and the apertures extend transversely of said trough above the top surface of the insulating member, printed conductors on the top surface of said insulating member connecting said printed conductors on said magnetic element means, and insulated wires threaded through said apertures and extending in a direction transverse to said troughs.

7. The combination of an insulating member having a top surface with a trough therein, a plurality of magnetic elements each having sides and a transverse aperture and each having a printed conductor on said sides and on the walls of said aperture, said magnetic elements being positioned with edges in said trough of the insulating member so that portions of the printed conductors on the sides of the magnetic elements extend down into said trough and the apertures extend transversely of said trough above the top surface of the insulating member, printed conductors on the top surface of said insulating member each connecting the printed conductor on one magnetic element to the printed conductor on adjacent magnetic elements to provide a conductive path linking all of said magnetic elements, and wires threaded through said apertures and extending in a direction transversely to said troughs.

8. The combination of insulating member means having top surfaces with a plurality of parallel extending troughs therein, a plurality of magnetic elements each having sides and a transverse aperture and each having a printed conductor on said sides and on the walls of said aperture, said magnetic elements being positioned with edges in said troughs of the insulating member means so that portions of the printed conductors on the sides of the magnetic elements extend down into said trough and the apertures extend transversely of said troughs above the top surfaces of the insulating member means, printed conductors on the top surfaces of said insulating member means each connecting the printed conductor on one magnetic element to the printed conductor on adjacent magnetic elements to provide conductive paths each linking all of the magnetic elements in one trough, and wires threaded through said apertures in a direction transversely to said troughs and linking corresponding memory magnetic elements in said plurality of troughs.

References Cited by the Examiner

UNITED STATES PATENTS

| | | | |
|---|---|---|---|
| 2,901,736 | 8/1959 | Sylvester | 340—174 |
| 2,970,296 | 1/1961 | Horton | 340—174 |
| 2,978,683 | 4/1961 | Alexander | 340—174 |
| 3,106,703 | 10/1963 | Katzin | 340—174 |
| 3,130,134 | 4/1964 | Jones | 340—174 |

FOREIGN PATENTS

| | | | |
|---|---|---|---|
| 562,214 | 5/1957 | Italy. | |

IRVING L. SRAGOW, *Primary Examiner.*

R. J. McCLOSKEY, M. S. GITTES, *Assistant Examiners.*